(12) United States Patent
Cheng

(10) Patent No.: US 11,525,500 B2
(45) Date of Patent: *Dec. 13, 2022

(54) INTERNAL STRUCTURE OF ACTUATOR FOR DIFFERENTIAL MODE SHIFT

(71) Applicant: Zhejiang CFMOTO Power Co., Ltd., Zhejiang (CN)

(72) Inventor: Fuying Cheng, Hangzhou (CN)

(73) Assignee: Zhejiang CFMOTO Power Co. Ltd., Zhejiang (CN)

( * ) Notice: Subject to any disclaimer, the term of this patent is extended or adjusted under 35 U.S.C. 154(b) by 124 days.

This patent is subject to a terminal disclaimer.

(21) Appl. No.: 17/140,219

(22) Filed: Jan. 4, 2021

(65) Prior Publication Data

US 2021/0207695 A1    Jul. 8, 2021

(30) Foreign Application Priority Data

Jan. 3, 2020  (CN) .......................... 202010004804.4
Jan. 3, 2020  (CN) .......................... 202010004806.3
Jan. 3, 2020  (CN) .......................... 202010005027.5
Jan. 3, 2020  (CN) .......................... 202010005037.9

(51) Int. Cl.
  *H02K 7/00*   (2006.01)
  *F16H 48/34*  (2012.01)
  (Continued)

(52) U.S. Cl.
  CPC ............. *F16H 48/34* (2013.01); *B60K 23/04* (2013.01); *B60K 23/08* (2013.01); *F16H 48/38* (2013.01); *G01B 7/003* (2013.01); *H02K 7/1166* (2013.01); *B60K 2023/046* (2013.01); *F16H 2048/343* (2013.01)

(58) Field of Classification Search
  CPC .......... G01B 7/00; G01B 7/003; B60K 23/08; B60K 23/24; B60K 23/04; F16H 48/24; F16H 48/34; F16H 48/38; G01D 5/1655; H02K 7/00; H02K 7/11; H02K 7/1166
  See application file for complete search history.

(56) References Cited

U.S. PATENT DOCUMENTS 4,805,472 A  2/1989 Aoki et al.
4,805,486 A  2/1989 Hagiwara et al.
(Continued)

FOREIGN PATENT DOCUMENTS

EP          0152590   * 12/1984   ............... B61C 9/52

*Primary Examiner* — Tran N Nguyen
(74) *Attorney, Agent, or Firm* — Shewchuk IP Services, LLC; Jeffrey D. Shewchuk

(57) ABSTRACT

An actuator is used to longitudinally move a spline sleeve for controlling drive mode of a differential on an off-road vehicle. The actuator's motor rotates an eccentric knob through a drive train including intermediate gears and a worm gear. The eccentric knob is linked to the spline sleeve through a torsion spring carried on a pivot plate, with legs of the torsion spring pushing a slide block, transferring a moment provided by the eccentric knob into a linear slide force. The pivot plate and torsion spring are jointly mounted on the actuator housing by a hub, opposite the rotational axis of the eccentric knob from the slide block. The slide block includes a contact which completes a circuit through conductive pads on the actuator housing, so the position of the slide block can be directly sensed.

11 Claims, 9 Drawing Sheets

(51) Int. Cl.
*F16H 48/38* (2012.01)
*H02K 7/116* (2006.01)
*B60K 23/04* (2006.01)
*B60K 23/08* (2006.01)
*G01B 7/00* (2006.01)

(56) References Cited

U.S. PATENT DOCUMENTS

| | | |
|---|---|---|
| 5,080,640 A | 1/1992 | Botterill |
| 6,176,152 B1 | 1/2001 | Victoria et al. |
| 6,503,167 B1 | 1/2003 | Sturm |
| 7,201,074 B2 | 4/2007 | Ima |
| 9,216,649 B2 | 12/2015 | Beasock et al. |
| 10,816,071 B2 | 10/2020 | Cheng et al. |
| 11,353,099 B2 * | 6/2022 | Cheng .................. F16H 48/38 |
| 2010/0144478 A1 | 6/2010 | Fan |

* cited by examiner

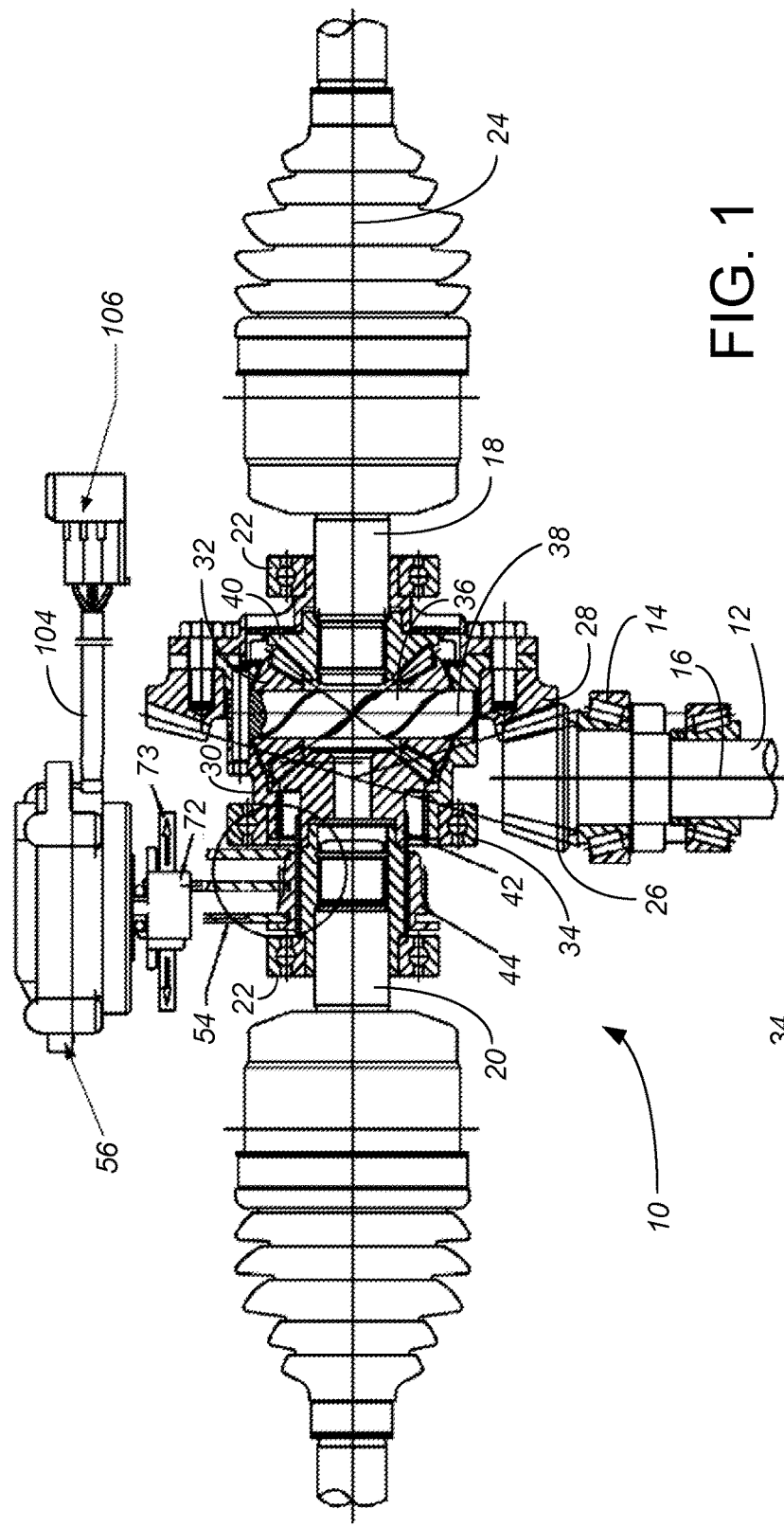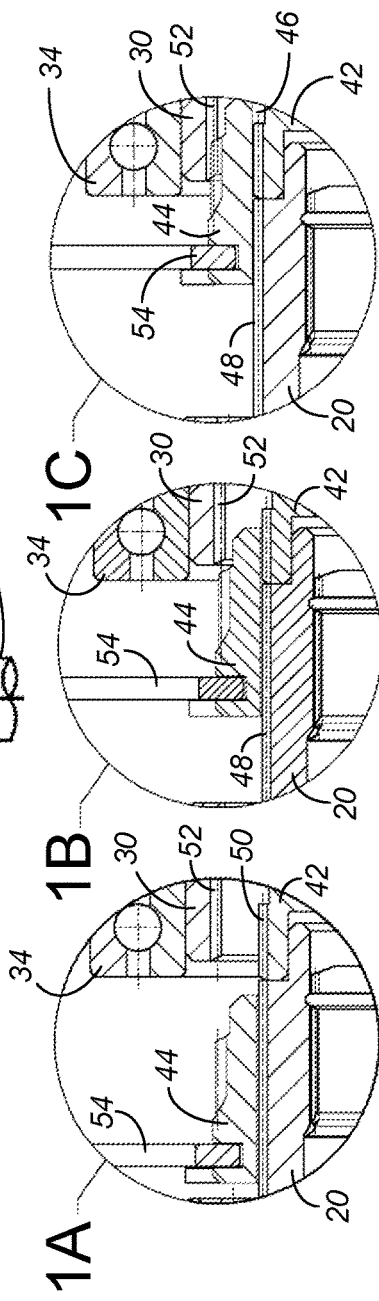
FIG. 1

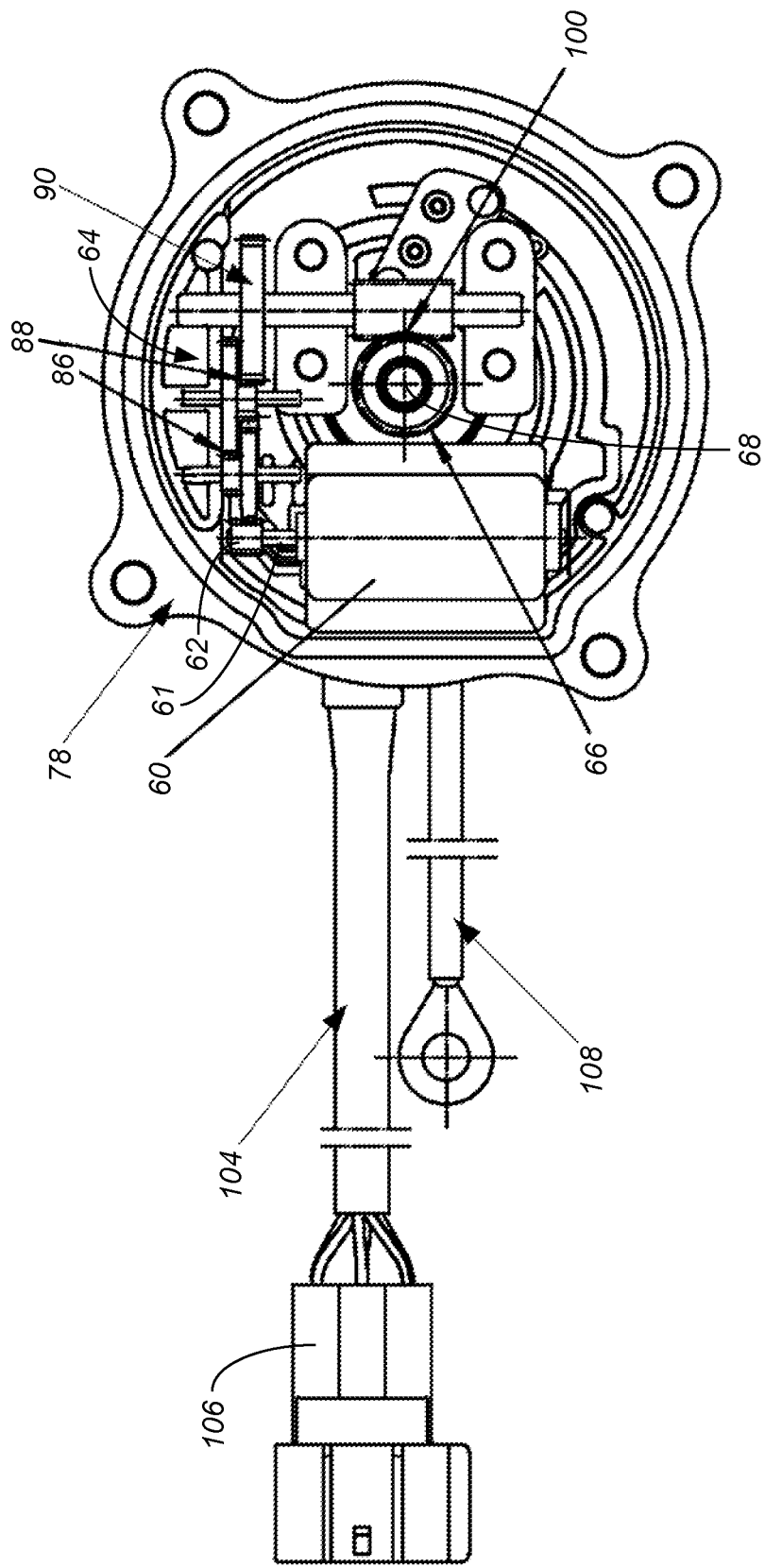

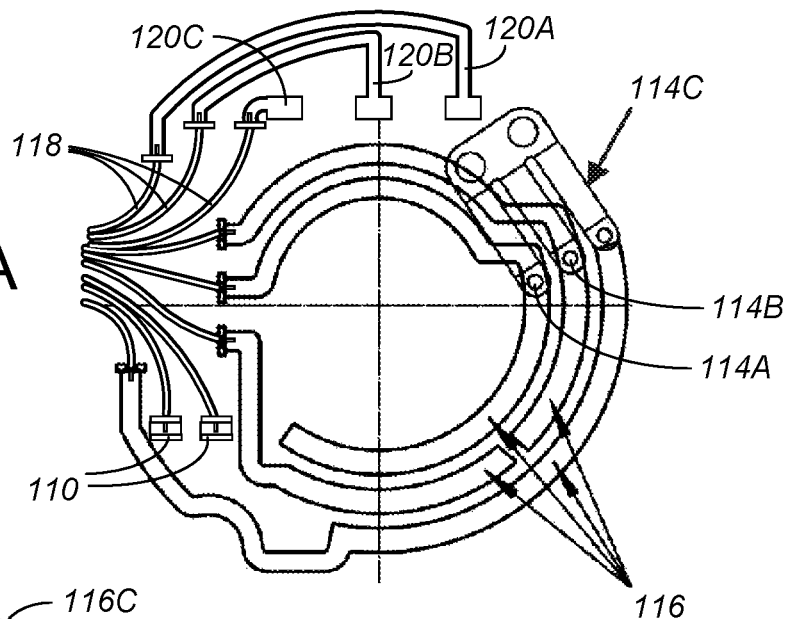
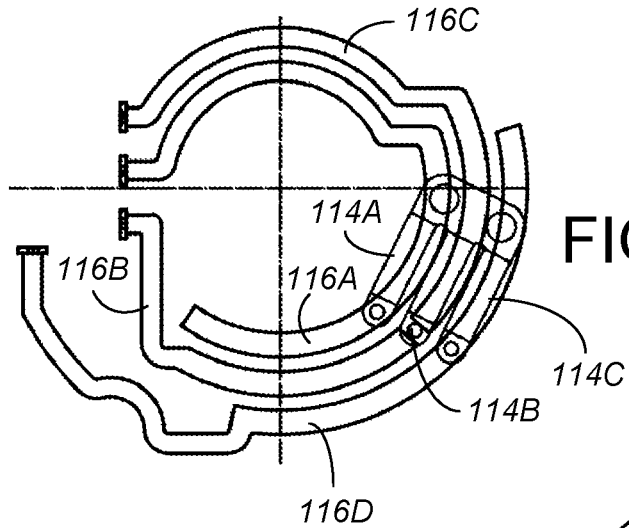
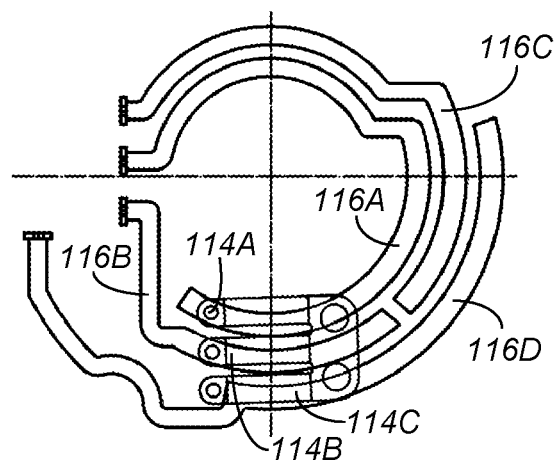

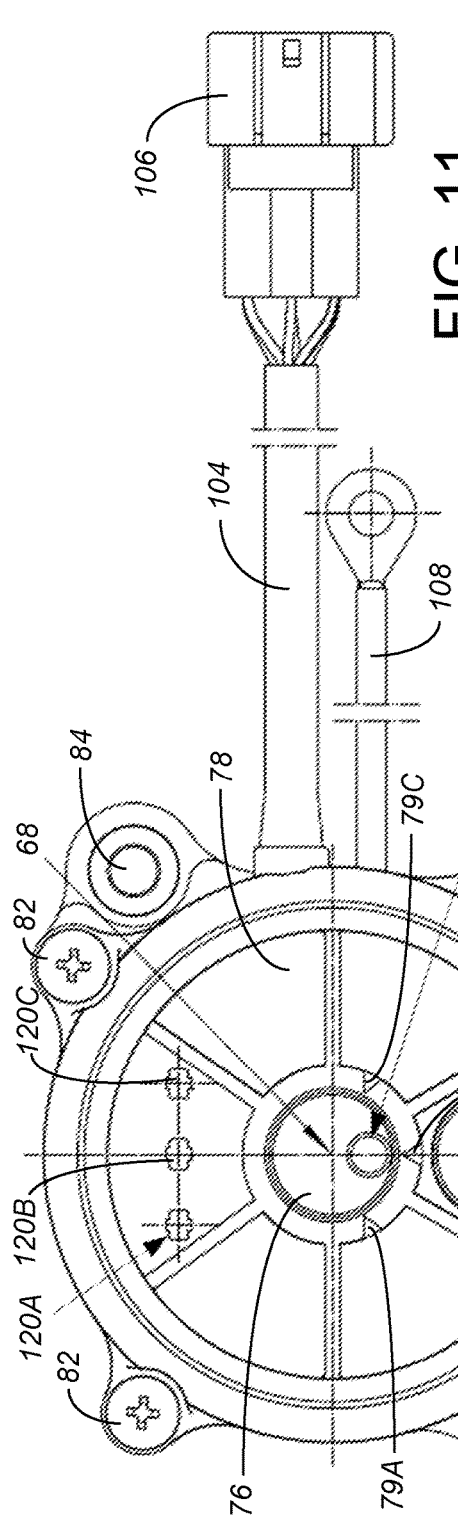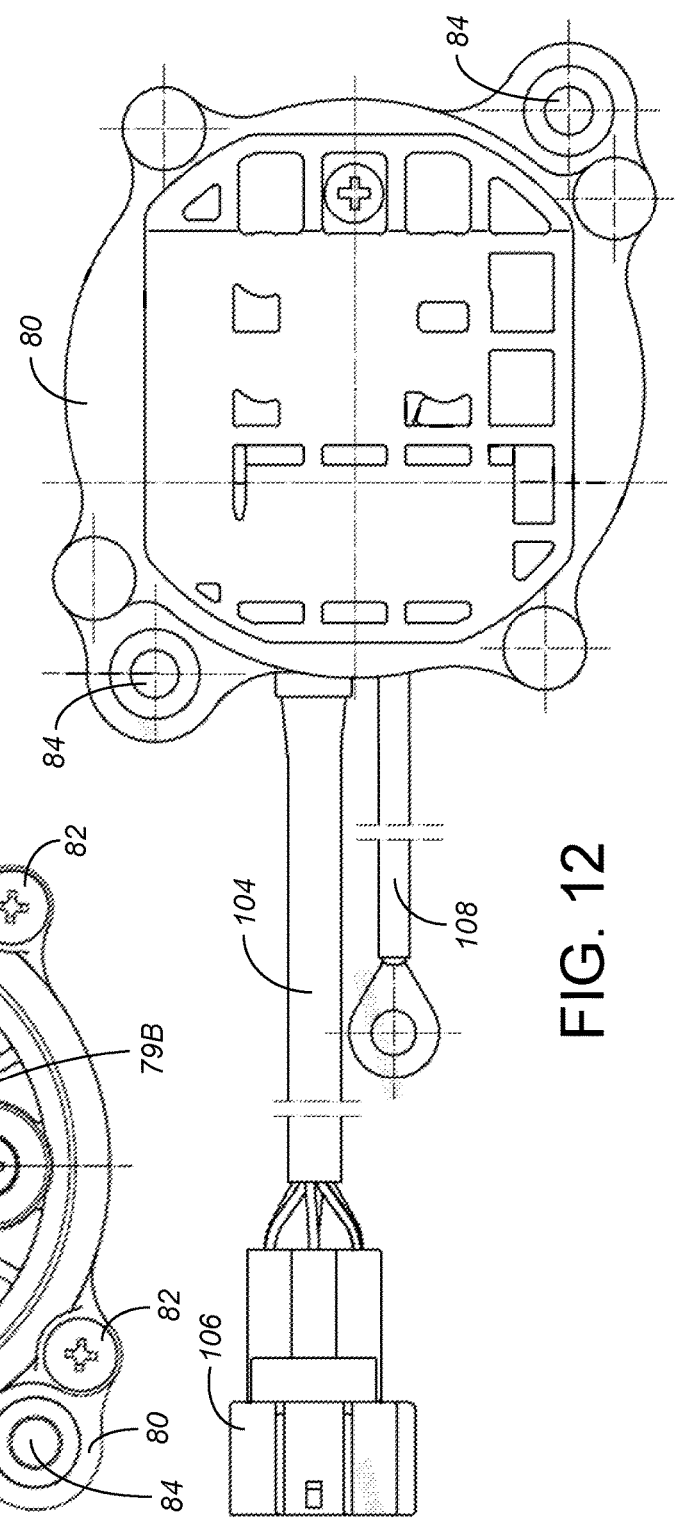

INTERNAL STRUCTURE OF ACTUATOR FOR DIFFERENTIAL MODE SHIFT

CROSS-REFERENCE TO RELATED U.S. APPLICATION(S)

None.

FIELD OF THE INVENTION

The present invention relates to drive trains in vehicles, and particularly to mechanical locking differentials used in offroad vehicles such as UVs and ATVs.

BACKGROUND OF THE INVENTION

Utility vehicles ("UVs") and all terrain vehicles ("ATVs") are well known for travel over a wide variety of terrains, including over unpaved trails or fields, rocks, etc. Such vehicles are widely used in agriculture and forestry operations, as well as in safety operations such as for rugged mountain crossings. Such vehicles are also widely used for recreational enjoyment in natural, outdoor settings away from pavement.

In many prior art UVs and ATVs, the engine transmits power to the wheels through a drive shaft, a differential, and a drive axle for each wheel. Differential drive axles of on-road vehicles must meet requirements of various road conditions and complex working conditions. Examples of differential drive axles for UV and ATV use are shown in U.S. Pat. Nos. 4,805,486, 10,788,113 and 10,816,071, all three incorporated by reference. Many such differentials include a mechanical locking mechanism, such as a spline sleeve which can be axially slid by a shifting fork between engaged and disengaged positions. In the engaged or locked position, one of the half shafts is rotationally secured by the spline sleeve for rotating at the same speed as the differential case, and the differential then causes the other half shaft to rotate at the same speed. In the disengaged or unlocked position, the two half shafts can rotate at different speeds as long as their average matches the rotational speed of the differential case. Some such mechanical locking differentials can have their spline sleeve shifted to a third position, where neither half shaft receives torque from the differential case, for driving in a two wheel drive mode using the other set of wheels.

As taught in U.S. Pat. No. 10,816,071, actuation of the shifting fork can be powered by a small electric motor connected to the shifting fork through a gear train and a sliding rack. The system of U.S. Pat. No. 10,816,071 is light and compact and often functions smoothly. However, positioning of the small gears in the gear train and positioning of the sliding rack needs to be quite accurate during assembly, and inaccurate assembly can cause gear slippage and/or require reassembly. If the spline sleeve, shifting fork or any gears in the gear train bind or otherwise fail to smoothly shift, the various parts can easily be damaged, and the service life of the actuator can be lower than desired. Disassembly and reassembly of the small gear train part is particularly, difficult without fully removing the differential from the vehicle. Better options are needed.

BRIEF SUMMARY OF THE INVENTION

The present invention is an actuator for controlling drive mode of a mechanical locking differential, such as between modes of two wheel drive, four wheel drive with differential active and four wheel drive with differential locked. The actuator has an electronic motor driving a gear train within a housing. The output of the gear train includes a knob which extends outside the housing, which is eccentric relative to the gear train output rotational axis. In one aspect, the gear train includes a worm gear mounted within the housing, on an opposite side of the gear train output rotational axis from the motor. In another aspect, the motor drives the eccentric knob between circumferential end positions which are less than 360° of rotation apart.

BRIEF DESCRIPTION OF THE DRAWINGS

The present invention is described with reference to the attached drawing sheets, in which:

FIG. 1 is a plan view, in partial cross-section, showing a two-wheel-drive/four-wheel-drive/four-wheel-drive locked differential structure relative to the input bevel gear and half shafts, and showing the actuator of the preferred embodiment of the present invention. A circle is added to show enlarged inset views 1A showing the spline sleeve and shifting fork in the two wheel drive position, 1B showing the spline sleeve and shifting fork in the four wheel drive, differential-active position, and 1C showing the spline sleeve and shifting fork in the four wheel drive, differential-lock position.

FIG. 5 is a rear view of the preferred actuator of FIGS. 1 and 2 with its housing base removed.

FIG. 6A is a rear view of the electric circuit within the cover, showing the electrical contacts in a first (in this embodiment, two wheel drive) position. FIG. 6B shows the circular trace circuit and the electrical contacts in a second (in this embodiment, four wheel drive, differential-active) position, and FIG. 6C shows the circular trace circuit and the electrical contacts in a second (in this embodiment, four wheel drive, differential-active) position.

FIG. 11 is a front view of the preferred actuator housing and cabling.

FIG. 12 is a rear view of the preferred actuator housing and cabling.

Figure 2:
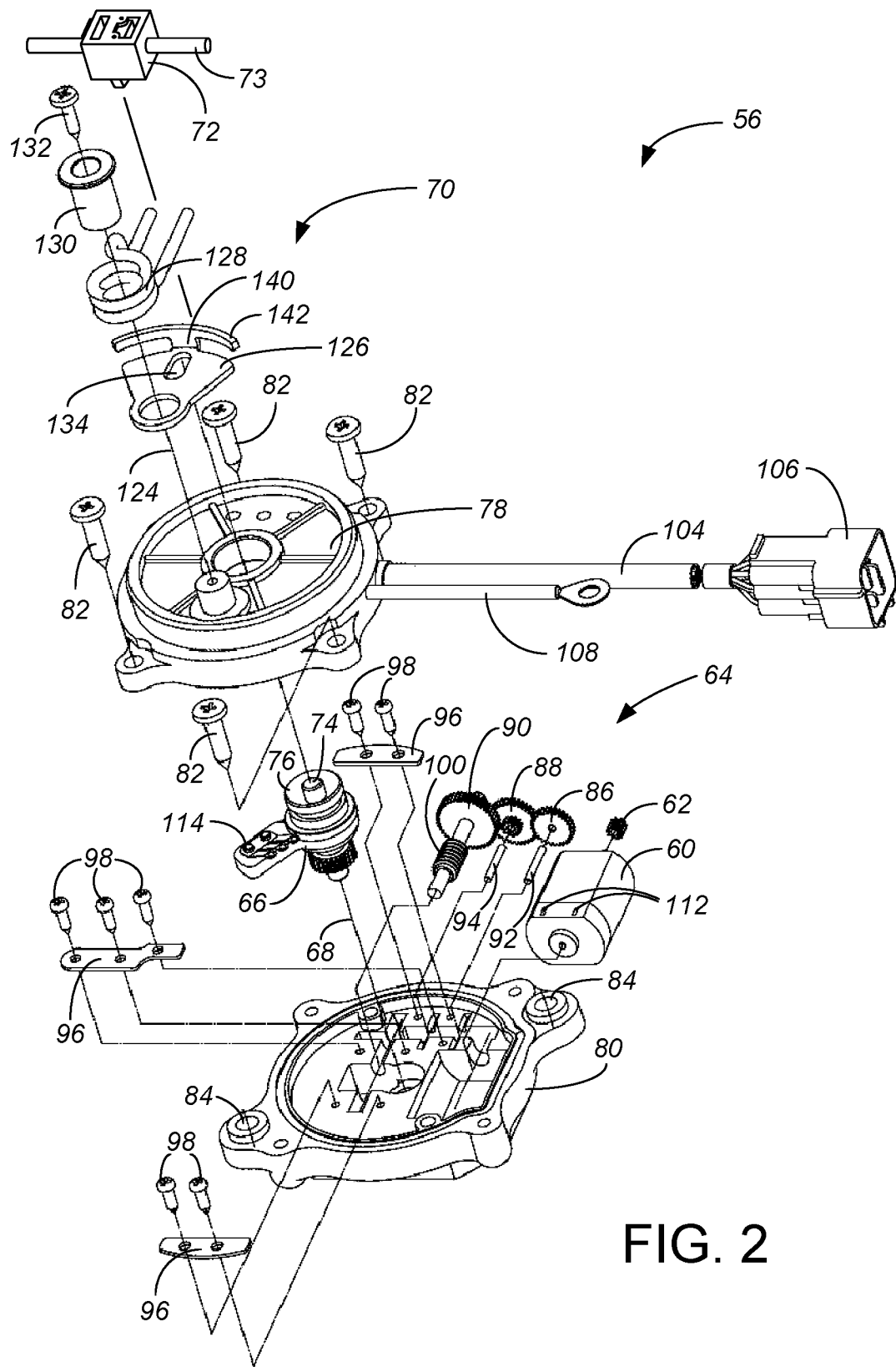
FIG. 2 is an exploded front perspective view of the actuator of FIG. 1, looking upward from the lower right. The terms "front", "rear", "left" and "right", as used herein, apply to the actuator for use on a rear differential, merely for ease of reference when referring to the drawings; other orientations of layouts or orientations of use, in whole or in part, are equally possible.
Figure 3:
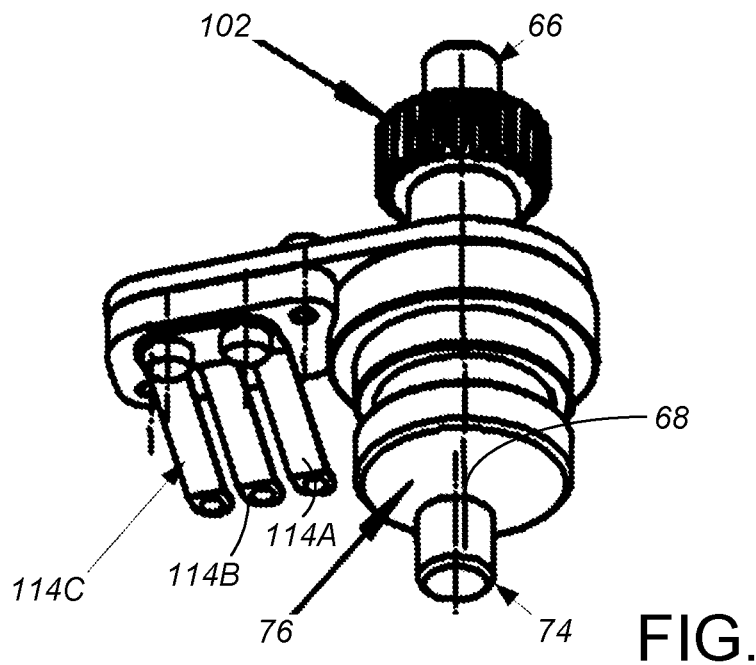
FIG. 3 is an enlarged front perspective view of the output gear and shifting knob of the preferred actuator, looking downward.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

The invention relates to a mechanical locking differential particularly intended for use in a drive train of a UV or ATV, with the preferred internal structure of an example differential 10 shown in FIG. 1. The mechanical locking differential 10 has an input 12 supported on bearings 14 for rotational power about a generally longitudinal axis 16 on the UV or ATV, with two outputs or axles 18, 20 mounted on bearings 22 for rotational power about a generally transverse axis 24 on the UV or ATV. The axles 18, 20 could be either for front wheels or rear wheels (not shown), and in either case the structure 10 can be reversed right-to-left. An input bevel gear 26 delivers rotational power from the vehicle engine (not shown). While the vehicle is running to power the input bevel gear, torque is transmitted from the input bevel gear 26 to a ring gear 28 fixed to a differential case 30, with at least one pinion or planetary gear 32 positioned therein. The differential case 30 is rotationally supported within the differential bonging (not shown) by roller bearings 34. The pinion gear 32 is supported on shaft 36 to rotate about the transverse axis 20 at the speed of the differential case 30, but can additionally rotate about its own axis 38. The pinion gear 32 is in geared engagement with both side gears 40, 42, such the rotational speed of the differential case 30 will always equal the average of the rotational speeds that the two side gear 40, 42 rotate about transverse axis 20.

One of the side gears 40 is rotationally coupled to its axle 18 at all times. The other side gear 42 may or may not be rotationally coupled to axle 20, depending upon the axial position of a spline sleeve 44, with three axial positions 1A, 1B, 1C depicted in FIG. 1. The spline sleeve 44 includes one or more inwardly facing teeth 46, which couple with one or more outwardly facing teeth 48 on the axle 20 and at times with one or more outwardly facing teeth 50 on the side gear 42. When the spline sleeve 44 is in the outer position 1A, the spline sleeve 44 only rides on the outwardly facing teeth 48 of the axle 20 and does not interact with the side gear 42. Thus, in this position 1A, the side gear 42 can rotate at any speed, independent of the rotational speed of the axle 20 and its wheel. With the spline sleeve 44 in the outer position 1A, any difference between the rotational speed of the ring gear 28 and the axle 18 will merely cause the pinion or planetary gear 32 to rotate about its axis 38, so no torque can be transmitted through the differential 10. Accordingly, with the spline sleeve 44 in the outer position 1A, the vehicle operates in a two wheel drive mode, only providing torque to the other (not shown) set of axles and wheels, such as the front wheels if FIG. 1 depicts a rear differential 10.

The spline sleeve 44 can be shifted to a center position 1B, in which the spline sleeve 44 rides on the outwardly facing teeth 50 of the side gear 42 as well as the outwardly facing teeth 48 of the axle 20, causing the axle 20 to rotate at the identical rotational speed as the side gear 42. If the vehicle is traveling in a straight line, both side gears 40, 42 and both axles 18, 20 will rotate at the rotational speed of the ring gear 28 and differential case 30 about the transverse axis 24, and torque is transmitted from the input bevel gear 26 to both axles 18, 20. When a rotational difference is caused between the outputs 18, 20 at the time of turning or cornering of the UV or ATV, the pinion gear 32 rotates around its own axis 38 to correct the rotational difference between the inner and outer wheels. Rotation of the pinion gear 32 about its own axis 38 increases the rotational speed of one of the semi-axle gears 40, 42 about the transverse axis 24 while equally decreasing the rotational speed of the other of the semi-axle gears 40, 42 about the transverse axis 24. Thus, the center position 1B of the spline sleeve 44 is for a mode of four wheel drive using the differential 10.

The spline sleeve 44 can also be shifted to an inner position 1C. In the inner position 1C, the spline sleeve 44 rides on the outwardly facing teeth 50 of the side gear 42 and the outwardly facing teeth 48 of the axle 20, while simultaneously engaging inwardly facing teeth 52 of the differential case 30. With the spline sleeve 44 in the inner position 1C, the spline sleeve 44 thus causes the differential case 30, the side gear 42 and the axle 20 to all rotate at the same rotational speed. By rotationally fixing the side gear 42 to the differential case 30, the pinion gear 32 is prevented from rotating about its axis 38, and thus the side gear 40 also rotates at the identical rotational speed as the side gear 42 and differential case 30. Torque can still be transmitted through the differential 10, but the differential 10 is locked. Thus, the inner position 1C of the spline sleeve 44 is for a four wheel drive, differential-locked mode.

A shifting fork 54 is used to push the spline sleeve 44 between the inner, center and outer positions 1A, 1B, 1C. Movement of the shifting fork 54 is controlled by an actuator 56 which is the focus of the present invention. An exploded view of the actuator 56 is shown in FIG. 2.

Figure 7:
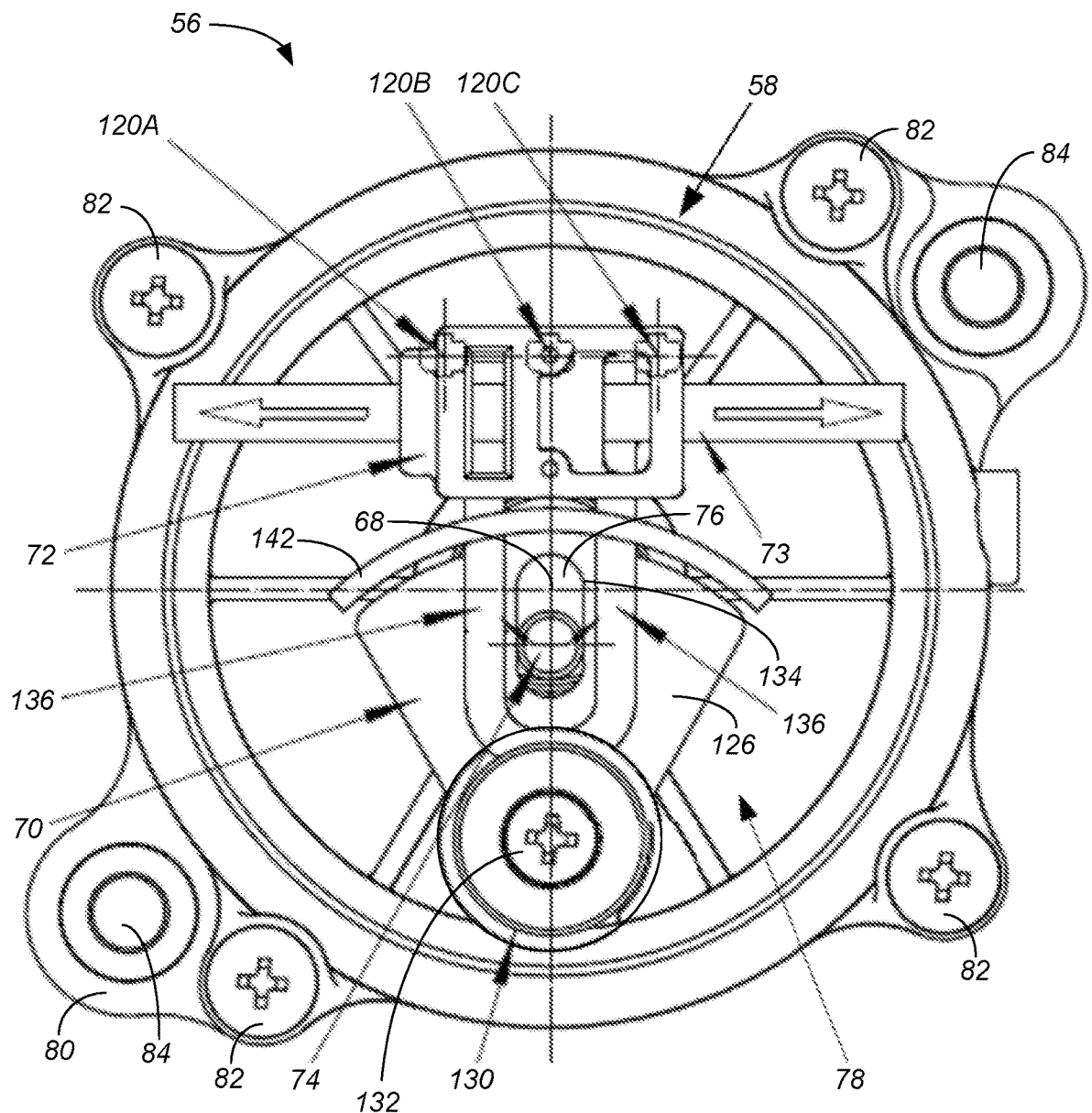
FIG. 7 is a front view of the preferred actuator of FIGS. 1 and 2, after assembly of the pivot plate, torsion spring and slide block.
Figure 9:
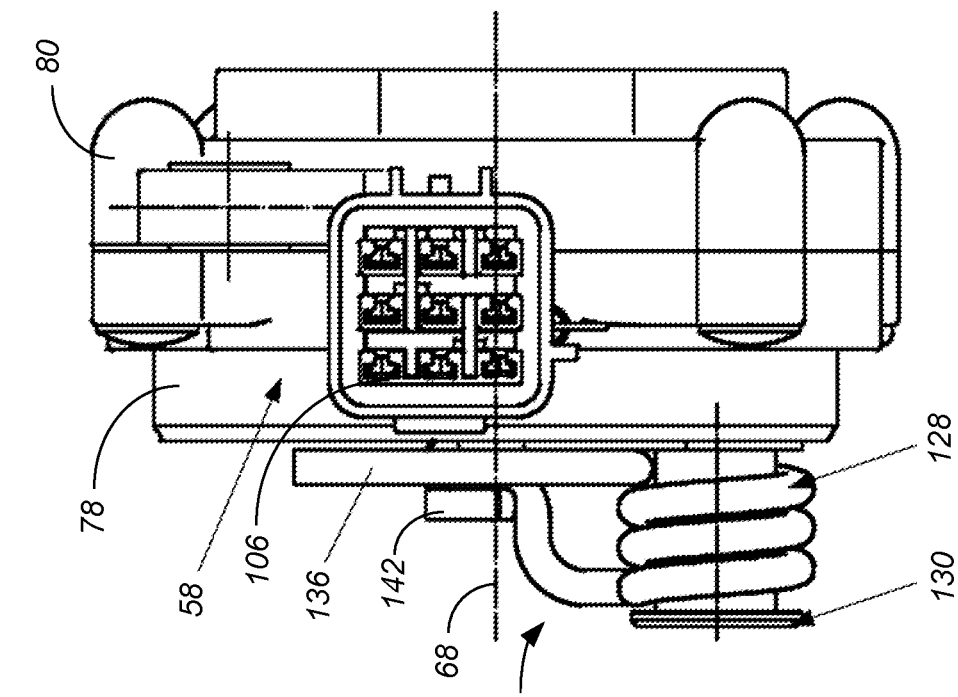
FIG. 9 is a side view of FIG. 8.
Figure 8:
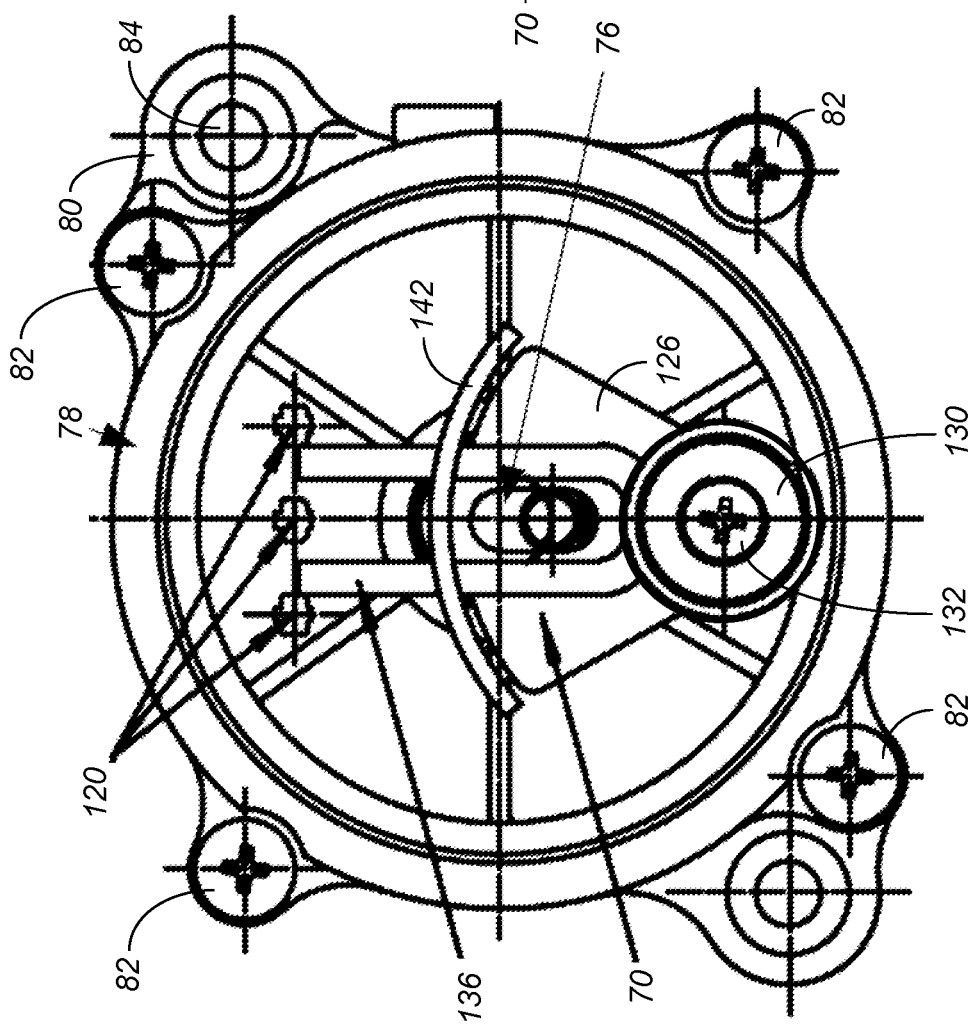
FIG. 8 is a front view of the preferred actuator of FIGS. 1, 2 and 7, removing the slide block.

The actuator 56 includes a housing 58, with an electric motor 60 supported within the housing 58. The electric motor 60 drives a motor output gear 62 as part of a gear train 64 to an output 66, which rotates about a gear train output axis 68. The output 66 pivotally moves a pivot link 70, which in turn linearly moves a slide block 72 carrying the shifting fork 54. Arrows are added in FIGS. 2 and 7 to show the shifting motion of the slide block 72 from its center position 1B.

The slide block 72 includes a configuration adapted for mounting of the shifting fork 54. Other than in FIG. 1, the connection between the slide block 72 and the shifting fork 54 is not shown, and the particular mounting arrangement between the slide block 72 and the shifting fork 54 is not part of the present invention. In the preferred arrangement, the slide block 72 slides on a slide shaft 73 which extends through an opening in the slide block 72. The slide shaft 73 can be mounted on a stationary portion of the differential 10, on the housing 58, or elsewhere from a stationary portion of the frame or rest of the vehicle, and its mounting arrangement is not shown in the figures and is not part of the present invention. Other mounting arrangements are possible for the slide block 72 to move linearly and carry the shifting fork 54.

In the preferred arrangement, the output 66 is an eccentric actuator output which includes an eccentric knob 74, accessible on the exterior of the housing 58, attached for rotation with the gear train output 66 about the gear train output axis 68. Movement of the knob 74 causes shifting of the differential state, so the knob 74 can be referred to as a "shifting" knob 74. The shifting knob 74 is offset from the gear train output axis 68, such that rotation of the gear train output 66 causes the shifting knob 74 to move from side to side. The preferred mounting arrangement relative to the differential 10 mounts the actuator 56 with the gear train output axis 68 extending horizontally, parallel to the input bevel gear axis 16. The shifting knob 74 preferably extends from a rotating plate 76 of the gear train output 66. The rotating plate 76 of the gear train output 66 is preferably arranged continuous with an exterior profile defined by the housing 58, such that the exterior of the housing 58 and the rotating plate 76 jointly seal the actuator housing 58 against dirt entry into the interior volume. For instance, after assembly the plate 76 of the gear train output 66 is coplanar with and centered within the housing cover 78.

Figure 10:
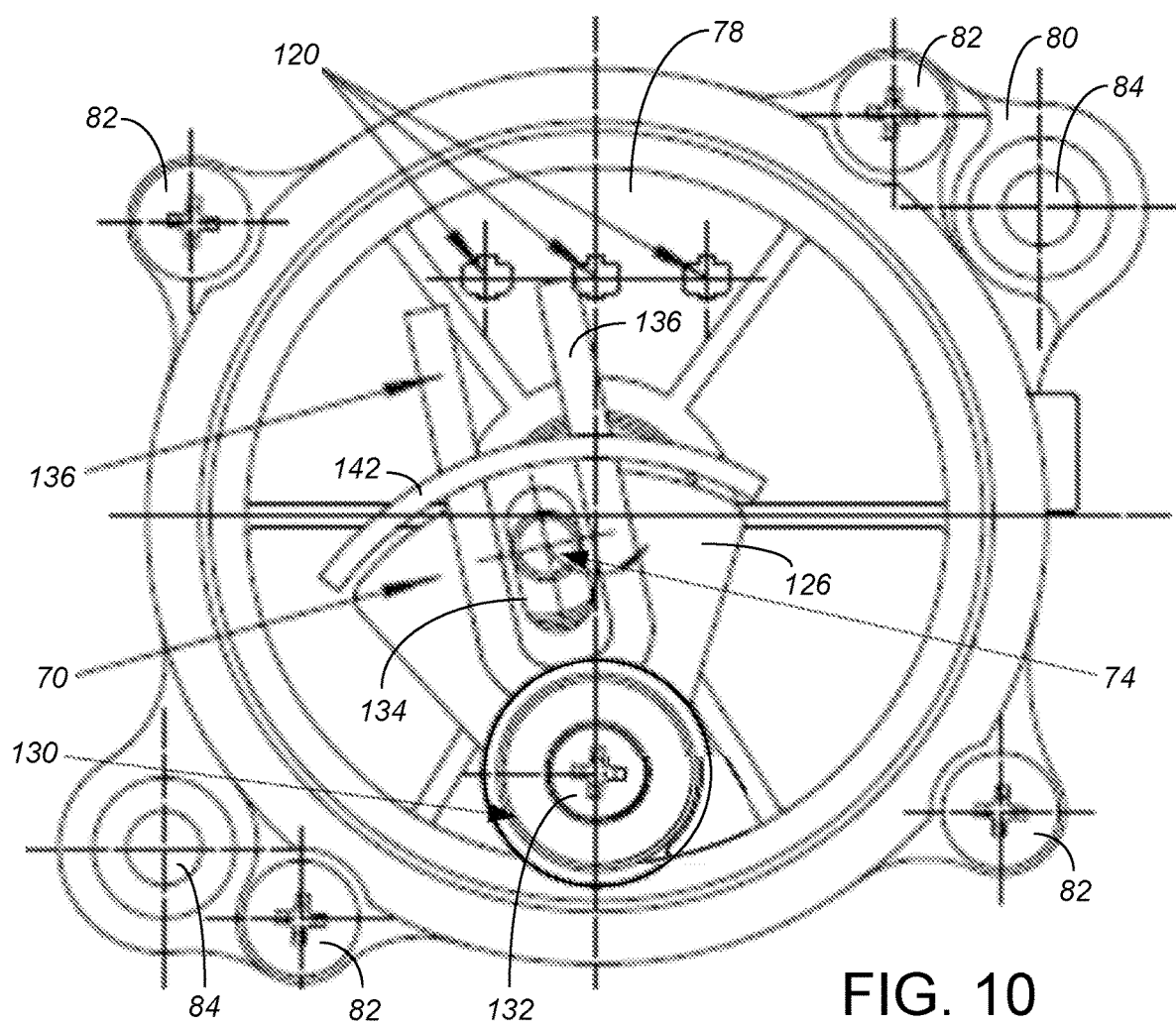
FIG. 10 is a front view of the preferred actuator similar to FIG. 8, but shown in the two-wheel-drive position.

In one embodiment, the motor only rotates in one direction. In the more preferred arrangement, the motor 60 can be electronically controlled to selectively rotate in either direction. Using a bi-directional motor 60 allows the shifting fork 54 to be moved in either direction from the middle position 1B at any given time, merely by selecting the direction of rotation of the motor 60. In the preferred mounting arrangement, the output 66 rotates less than 360° between circumferential end points, and more preferably between 90° and 180° between circumferential end points. If desired, the circumferential end points may be shown on the cover 78 as shown in FIG. 11, such as by markings 79A and 79C, with the center position indicated by marking 79B. For instance, in the most preferred embodiment, the lowest position 79B of the shifting knob 74 (i.e., a six o'clock position as depicted in the front view drawings) is used for the center position 1B of the spline sleeve 44 and shifting fork 54. From this center position 79B, the motor 60 can turn to rotate the shifting knob 74 about 62° to the right (and rotationally upward, to about a four o'clock position 79C as depicted in the front view drawings) to bias the shifting fork 54 fully toward the inner position 1C, or about 62° to the left (and rotationally upward, to about an eight o'clock position 79A as depicted in the front view drawings and as shown in FIG. 10) to bias the shifting fork 54 fully toward the outer position 1A.

A primary purpose of the housing 58 is to define an interior space which protects the electric motor 60 and the gear train 64 from the dirt, mud and grime that they otherwise could be exposed to when mounted relative to a drive train of an off-road vehicle such as an ATV or UV. The housing 58 should be light in weight while being strong and rigid. In a preferred embodiment, the housing 58 includes a base 80 and a cover 78, both of which are molded from an automotive grade polymer resin. The cover 78 can be secured to the base 80 around the motor 60 and gear train 64, such as using fasteners such as the machine screws 82 shown. Having the cover 78 be initially separate from the base 80 primarily assists in manufacturing assembly of the gear train 64. Using removable fasteners 82 also allows inspection or repair of any component parts.

The housing 58 may include two or more mounting bolt holes 84 for mounting the actuator 56 relative to the vehicle and relative to the differential 10. In the preferred embodiment, the axes for the mounting bolt hole 84 extend horizontally, which makes assembly and disassembly on the vehicle relative to the sliding block 72 and the shifting fork 54 easier.

In the preferred embodiment, the housing 58 is generally cylindrical, with the output 66 rotating about an output rotation axis 68 that is coaxial with the cylindrical shape of the housing 58. As best shown in FIG. 2, the base 80 of the preferred housing 58 includes recesses shaped to receive the specific electric motor 60 being used as well as the various gears 86, 88, 90 in the gear train 64 on their shafts 92, 94. If desired, the cover 78 can include complimentary recesses (not shown). Using separate recesses for supporting and aligning the electronic motor 60 and each gear 86, 88, 90 in the gear train 64 helps make assembly and support of the gear train 64 much easier and more reliable. In the most preferred embodiment, motor output gear 62 and the intermediate gears 86, 88, 90 and the output 66 are all primarily molded of a rigid polymer for lightweight and ease of manufacture, but mounted to spin on metal (steel) shafts 92, 94. The various shafts 92, 94, 100 within the housing 58 can be held in place by mounting plates 96 secured by screws 98.

The gear train 64 includes a significant gear reduction to reduce angular movement and increase torque of the motor output shaft 61 to the gear train output 66. To achieve even more significant gear reduction, the preferred embodiment includes at least one worm gear 100. For instance, the preferred gear train 64 includes three intermediate gears 86, 88, 90, with the final intermediate gear 90 driving the worm gear 100. The gear train 64 preferably provides a gear reduction of at least ten times, and the worm gear 100 provides a gear reduction of at least ten times, i.e., to complete a 180° throw of the output 66, the motor shaft 61 would rotate at least 50 revolutions. In the most preferred embodiment, the output gear 62 of the motor 60 has about 10 teeth, and provide about a 3/1 a gear reduction to the first intermediate gear 86 which has about 30 outer gear teeth and 12 inner gear teeth, providing about a 3/1 gear reduction to the second intermediate gear 88 which has about 36 outer gear teeth and 12 inner gear teeth, providing about a 4/1 gear reduction to the third intermediate gear 90 which has about 48 outer gear teeth, i.e., the gear train 64 in the most preferred embodiment provides about a 36x gear reduction. The worm gear 100 in the most preferred embodiment drives a gear 102 with about 24 teeth, i.e., the worm gear 100 provides about a 24x gear reduction. In the most preferred embodiment, a complete throw of the output 66 (which moves the spline sleeve 44 from the inner position 1C to the outer position 1A), is about 125°. Thus, in the most preferred embodiment, to complete movement of the spline sleeve 44 from the inner position 1C to the outer position 1A, the motor shaft 61 rotates about 300 revolutions.

To best utilize the space within the cylindrical housing 58, the worm gear 100 is preferably mounted on an opposite side of the output axis 68 as the motor 60. For instance, in the most preferred arrangement, both the motor output shaft axis and the worm gear axis extend vertically. The worm gear axis is offset relative to the gear train output axis 68 on an opposite side from the motor output shaft axis.

The motor 60 has electric leads which extending outside the housing 58, at a minimum to supply electric power and a return path (which could be by grounding of the housing 58, if at least a portion of the housing 58 conducts electricity) to the motor 60. Preferably the power driving the motor 60 is in accordance with the electrical system of the vehicle, such as a 12 V DC system. The preferred leads include a cable 104 with a plurality of signal wires connectable with a standard automotive plug 106, with a separate grounding wire path 108. While a microcontroller could be included within the actuator 56, the preferred embodiment does not include any microcontroller or other logic circuit, and instead the electrical system within the actuator 56 is entirely carried along wires and/or signal traces. To make manufacturing easier and reduce costs, the electrical circuits in the preferred actuator 56 are entirely supported by the cover 78, with the interior circuitry best understood with reference to FIGS. 6A-6C and the exterior circuitry be understood by FIG. 11 in combination with FIG. 4. Both the signal cable 104 and the grounding wire 108 connect into and through the housing cover 78 rather than into or through the housing base 80.

The preferred embodiment includes three separate circuits arrangements within the cover 78. One circuit arrangement provides power for the motor 60 at a higher voltage and/or amperage than necessary for the other two circuit arrangements. As shown in FIG. 6A, the cover 78 supports two power contacts 110 for the motor 60, which make contact with contacts 112 on the motor 60 when the cover 78 is assembled over the motor 60 and base 80. One of these contacts 110 is connected into the ground wire 108. The other contact 110 is controlled outside the actuator 56, preferably providing power to the motor 60 at appropriate times at positive or negative 12V relative to the ground wire 108 for turning the motor 60 in one direction or the other.

If desired, to control how long the motor 60 runs to drive the shifting knob 74 between positions 79A, 79B, 79C, the motor 60 could be controlled by timing (on duration before turning off), or could be a stepper motor controlled by number of forward/reverse revolutions of the motor output shaft 61. In the preferred embodiment, however, the position of the shifting knob 74 is more directly assessed through a circuit which involves a plurality of electronic contacts 114 (in the preferred embodiment, three conductor legs 114A, 114B, 114C) mounted on the gear train output 66. As the gear train output 66 rotates, each contact 114 slides along a stationary circular arc trace circuit 116 printed on the inside surface of the housing cover 78. The circular trace circuit 116 is provided in four parts 116A, 116B, 116C, 116D, each of which is an exposed electrical conductor. The electric contacts 114 mounted on the gear train output 66 are all merely conductive with each other, connecting two (or three, when in between positions) of the four parts 116A, 116B, 116C, 116D of the trace circuit 116. If desired, this sliding contact circuit could be directly part of the power circuit for the motor 60, such as supplying the +−12V signal at the amperage required by the motor 60. In the preferred embodiment, the sliding contact circuit is operated at a lower amperage and voltage, thereby reducing power loss and not being tied to either the voltage or amperage required to drive the motor 60. The preferred embodiment is less costly than many other embodiments because it requires no memory of the last or current position of the output 66.

As drawn in this embodiment, the innermost trace 116A provides one side of the circuit, with the other three traces 116B, 116C, 116D provide the other side of the circuit. In the most preferred form, when it is desired to move to four-wheel-drive-differential-in-use mode (i.e., to the position shown in FIG. 6B, from either the position shown in FIG. 6A or the position shown in FIG. 6C), the clockwise middle trace 116B is supplied with high positive voltage and the counterclockwise middle trace 116C is supplied with high negative voltage relative to the innermost trace 116A. The motor 60 stops when the middle contact 114B hits the gap between the two middle traces 116B, 116C, when neither of the high traces are conductive with the output trace 116A. When it is desired to shift to two-wheel-drive mode (i.e., to the position shown in FIG. 6A, from either the position shown in FIG. 6B or the position shown in FIG. 6C), the counterclockwise middle trace 116C and the outermost trace 116D are supplied with high negative voltage relative to the innermost trace 116A. At the position shown in FIG. 6C, the counterclockwise middle trace 116C is connected to the output (innermost) trace 116A and starts the motor 60. At the position shown in FIG. 6B, the outer trace 116D is connected to the output (innermost) trace 116A and either continues or starts the motor 60. The motor 60 stops when the outer contact 114C moves past the end of the outermost trace 116D, when neither of the high traces are conductive with the output trace. When it is desired to move to four-wheel-drive-differential-lock mode (i.e., to the position shown in FIG. 6C, from either the position shown in FIG. 6A or the position shown in FIG. 6B), the middle clockwise trace 116B and the outermost trace 116D are supplied with high positive voltage relative to the innermost trace 116A. The motor 60 stops when the outer contact 114C moves past the other end of the outermost trace 116D, when neither of the high traces are connected to the output trace. Thus, the connection between the contacts 114 and their trace circuit 116 is used interrupt power to one of the electric leads of the motor 60 when the gear train output 66 has completed a desired throw of less than 360°.

Figure 4:
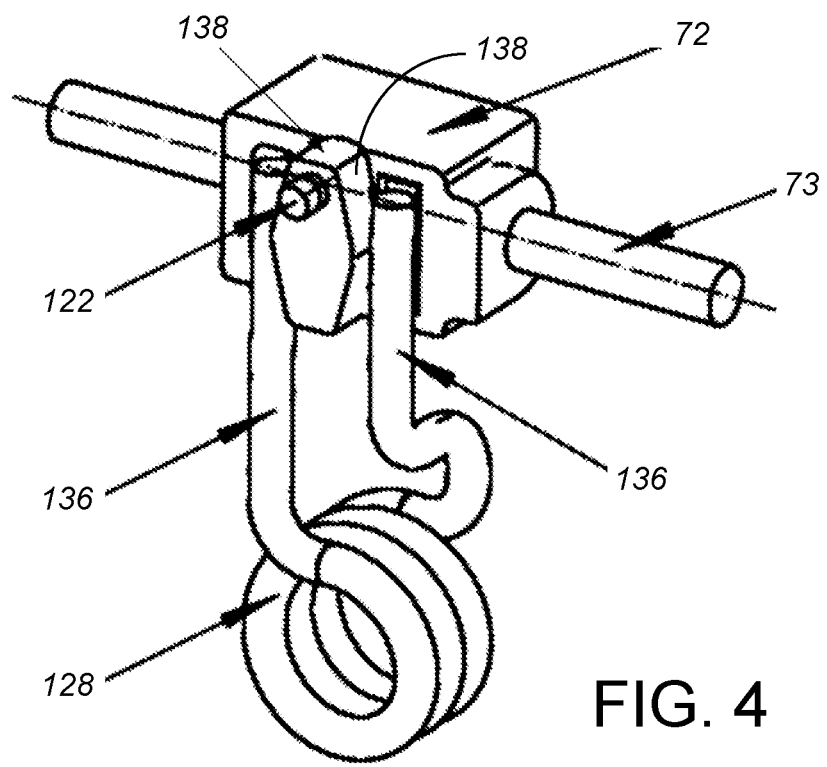
FIG. 4 is an enlarged rear perspective view of the torsion spring, slide block and slide shaft of the preferred actuator, looking downward.

If desired, the circular trace circuit 116 can also be used as a sensing circuit, with connectivity between the four parts 116A, 116B, 116C, 116D tested or sensed to determine the circumferential position of the output 66. However, such an arrangement does not necessarily tell the position of the sliding block 72 and spline sleeve 44, which could differ from the circumferential position of the output 66 due to the construction of the pivot link 70, described further below. The preferred embodiment includes a third separate electric circuit, which includes three wires 118 each connected to one of three conductive pads 120A, 120B, 120C. Each conductive pad 120A, 120B, 120C extends through the wall of the cover 78, exposed on the outside of the housing 58. The position of the conductive pads 120A, 120B, 120C correspond with the position of the sliding block 72 when the spline sleeve 44 is in each of the three positions 1A, 1B, 1C. In other words, the conductive pads 120A, 120B, 120C provide stationary contacts including a two-wheel-drive contact point 120A, a four-wheel-drive contact point 120B and a four-wheel-drive lock contact point 120C, all of which are aligned in a line parallel to the linear motion of the slide block 72. As best shown in FIG. 4, the sliding block 72 includes a spring loaded contact 122, which slides along the outside face of the cover 78. Further, the spring loaded contact 112 is preferably grounded, such as through the shifting fork 54, spline sleeve 44 and differential 10. Thus, when the sliding block 72 is in the position 1A, the circuit through the conductive pad 120A is completed. When the sliding block 72 is in the position 1B, the circuit through the conductive pad 120B is completed. When the sliding block 72 is in the position 1C, the circuit through the conductive pad 120C is completed.

All of these various signals/wires are transmitted through the signal cable 104, for use and/or control in a microcontroller or processor (not shown) elsewhere in the vehicle. For instance, the vehicle may have a control unit (not shown) which can detect if the rotational difference between the left and right wheels increases beyond the threshold seen in mere cornering. If one of the wheels is caught by mud or suspended airbourne while in four-wheel-drive-using-differential mode, the increased rotational difference is detected by the control unit, which sends the electrical signal to drive the motor 60 shifting the spline sleeve 44 to the differential lock position.

While many aspects of the present invention can use other types of linkages, the preferred connection between the shifting knob 74 and the sliding block 72 is provided by the pivot link 70. The pivot linkage 70 transfers a moment provided by the shifting knob 74 into a linear force on the slide block 72. The pivot link 70 pivots about a pivot axis 124 which is parallel to the output axis of rotation 68. While the pivot link 70 could alternatively be mounted on a stationary portion of the differential 10 or from a stationary portion of the frame or rest of the vehicle, the preferred arrangement mounts the pivot link 70 on the housing 58. More particularly, the preferred pivot link 70 includes a pivot plate 126 and a torsion spring 128, both jointly mounted on a hub 130 for pivoting about the pivot axis 124. A screw 132 can be used to removably mount the hub 130 to the cover 78 of the housing 58. The hub 130 makes assembly easy and helps maintain alignment of both the torsion spring 128 and the pivot plate 126.

The pivot plate 126 includes a slot 134 which slidingly receives the shifting knob 74. Movement of the shifting knob 74 thus causes the pivot plate 126 to pivot about the pivot axis 124. The pivot plate 126 holds the torsion spring 128. In the preferred embodiment, the torsion spring 128 includes two legs 136, ends of which are positioned around side surfaces 138 of the slide block 72. Middle portions of the two legs 136 are positioned around a neck 140 at the distal end of the pivot plate 126. The legs 136 extend radially relative to the pivot axis 124. When the pivot plate 126 is pivoted due to side to side motion of the shifting knob 74, the neck 140 pushes on one of the legs 136 of the torsion spring 128, biasing the torsion spring 128 toward pivoting with the pivot plate 126. The other leg 136 of the torsion spring 128 in turn pushes on the slide block 72, tending to resist pivoting.

Binding can occurs at times during sliding of the spline sleeve 44 into engagement with the side gear 42 or into engagement with the differential case 30, when the teeth 46, 50, 52 do not line up, temporarily preventing longitudinal movement of the spline sleeve 44. Shifting the position of the spline sleeve 44 can accordingly be difficult. Using the torsion spring 128 to transfer the motion produced by the motor 60 on the shifting knob 74 to the sliding block 72 gives the actuator 56 a way to absorb such binding or shifting difficulty, without stressing the motor 60 or the gear train 64. The spring 128 can store a force provided by the moment of the shifting knob 74 as it moves rotationally and later use that stored force to move the slide block 72 and the spline sleeve 44 in the longitudinal direction. Thus, using of the spring 128 within the pivot link 70 enables the use of a less expensive/powerful and smaller motor 60 and less expensive and smaller gears 62, 86, 88, 90, 100, 102 in the gear train 64.

As noted above, the potential for binding and the operation of the spring 128 means that the position of the slide block 72 may not always match the position of the shifting knob 74. Because the preferred actuator 56 can electrically sense this positional discrepancy, the sensing can also be used such as in an engine control unit (ECU), which can temporarily reduce or otherwise control the torque or rotational speed being output by the bevel gear 26 until the spline sleeve 44 fully shifts.

The pivot plate 126 includes an overbar 142 which captures and holds the two radially extending legs 136 around the neck 140. Due to the overbar 142, the plate 126 contacts each radially extending leg 136 both on a side toward the motor 60 and on a side away from the motor 60, to maintain alignment of the torsion spring 128. Assembly of the torsion spring 128 relative to the pivot plate 126 by inserting the legs 136 under the overbar 142 is easily done before mounting both the torsion spring 128 and pivot plate 126 to the housing cover 78 using the hub 130. After the torsion spring 128 has been assembled to the pivot plate 126, the pivot plate 126 makes damage to the alignment of the legs 136 of the torsion spring 128 much less likely, and maintains the alignment of the torsion spring 128 both to the pivot axis 124 and to the slide surfaces 138 of the sliding block 72.

The preferred mounting arrangement places the pivot axis 124 on the opposite side of the output axis 68 from the sliding block 72. That is, the pivot link 70 has a middle portion which receives the shifting knob 74 and an end portion engages the push surfaces 138 of the sliding block 72. When mounted in this location, the housing 58 tends to protect both the entirety of the pivot link 70 and the sliding block 72 from damage. Additionally, when mounted in this location, the distance of side to side motion of the sliding block 72 is greater than the distance of side to side motion of the shifting knob 74. The slide block 72 moves in a slide block movement direction, shown by arrows in FIGS. 1 and 7, which is perpendicular to a line intersecting both the output link axis of rotation 68 and the pivot axis 124.

The present invention thus provides a simple, low cost, lightweight actuator 56 for moving the spline sleeve 44. It readily provides information about the position of its components. It is easy to assemble, and very reliable in use, even in the rugged environment of ATV or UV usage.

Although the present invention has been described with reference to preferred embodiments, workers skilled in the art will recognize that changes may be made in form and detail without departing from the spirit and scope of the invention.

The invention claimed is:

1. An actuator for mechanically controlling drive mode of a differential in a drive train on an off-road vehicle, the actuator comprising:
   a housing adapted to be mounted relative to the drive train of the off-road vehicle adjacent the differential, the housing defining an interior volume and an exterior;
   an electronic motor mounted within the interior volume of the housing, the electronic motor rotatably driving a motor output shaft within the interior volume, the motor having electric leads extending outside the housing;
   a gear train mounted within the interior volume of the housing and driven by the motor output shaft to reduce angular movement and increase torque of the motor output shaft to a gear train output, the gear train output being rotatable about a gear train output axis; and
   an eccentric actuator output, accessible on the exterior of the housing, attached for rotation with the gear train output about the gear train output axis, the eccentric actuator output being offset from the gear train output axis.

2. The actuator of claim 1, wherein the actuator further comprises:
   a plurality of electronic contacts mounted on the gear train output, which electronic contacts interrupt at least one of the electric leads when the gear train output has completed a throw of less than 360°.

3. The actuator of claim 2, wherein the electric leads comprise at least two exposed stationary conductors each extending in an arc about the gear train output axis on an inside surface of the housing, and rotating conductors making sliding contact with the stationary conductors as the gear train output rotates.

4. The actuator of claim 3, wherein the housing is cylindrical, centered on the gear train output axis.

5. The actuator of claim 1, wherein the gear train comprises at least one worm gear.

6. The actuator of claim 5, wherein the housing comprises mounting bolt holes defining mounting bolt hole axes which extend horizontally, wherein the gear train output axis extends horizontally parallel to the mounting bolt holes, and wherein the motor output shaft rotates about a motor output shaft axis which extends vertically and is offset relative to the gear train output axis.

7. The actuator of claim 6, wherein the worm gear rotates about a worm gear axis, and wherein the worm gear axis extends vertically and is offset relative to the gear train output axis on an opposite side from the motor output shaft axis.

8. The actuator of claim 5, wherein the worm gear provides a worm gear gear reduction of at least ten times.

9. The actuator of claim 8, wherein the gear train provides a gear train gear reduction of at least ten times, in addition to the worm gear gear reduction.

10. The actuator of claim 1, wherein the eccentric actuator output is a shifting knob extending from a rotating plate of the gear train output, and wherein the plate is arranged continuous with an exterior profile defined by the housing, such that the exterior of the housing and the rotating plate jointly seal the actuator housing against dirt entry into the interior volume.

11. The actuator of claim 1, wherein the housing comprises a base and a cover, and wherein the base comprises separate recesses for supporting and aligning the electronic motor and each gear in the gear train.

\* \* \* \* \*